Figure 1:
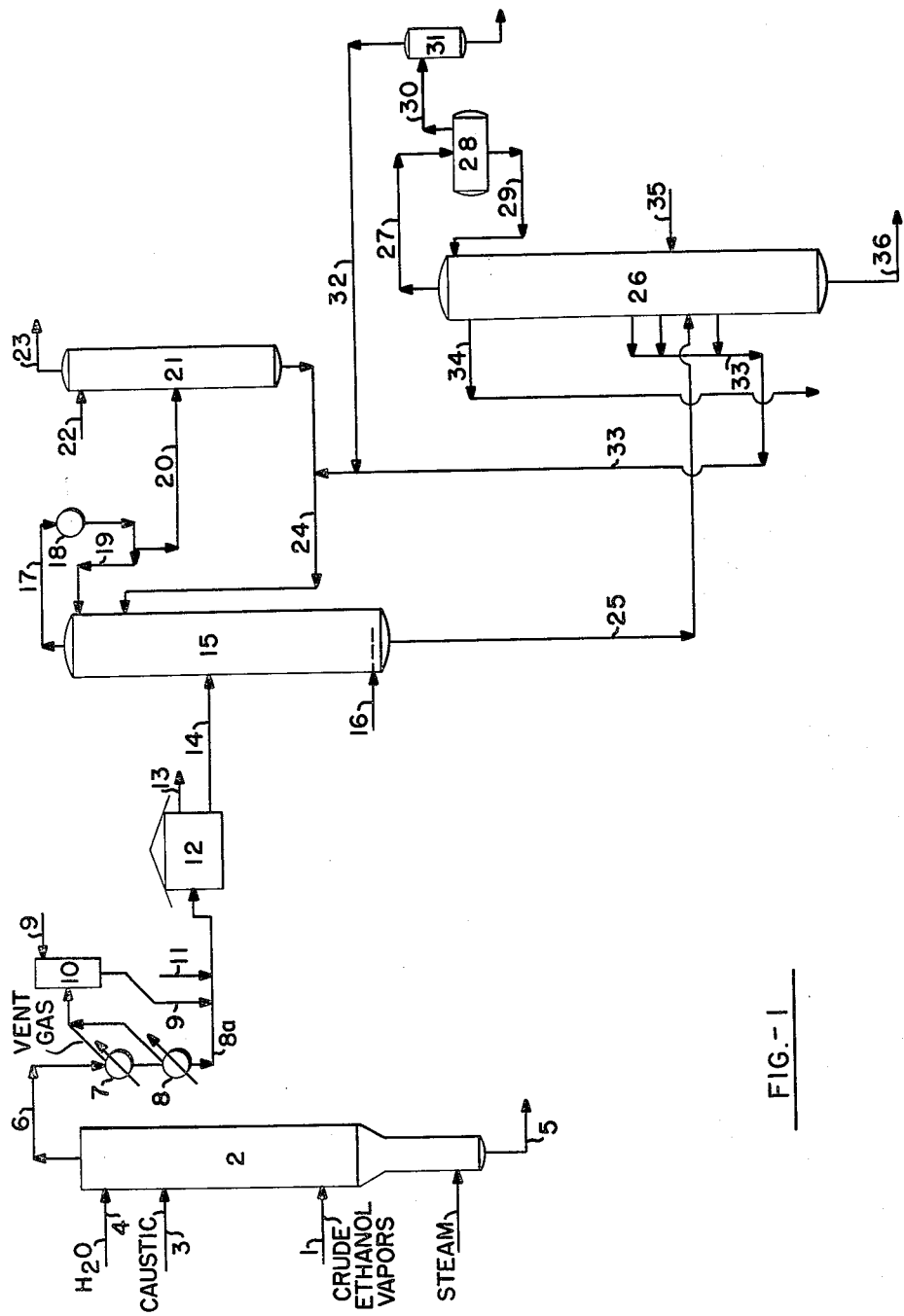

Dec. 26, 1961 S. W. WILSON 3,014,971
METHOD OF IMPROVING THE PERMANGANATE TIME OF ETHYL ALCOHOL
Filed Dec. 17, 1958 2 Sheets-Sheet 1

Samuel W. Wilson Inventor
By Seymour Stoll Attorney

Samuel W. Wilson  Inventor
By *Seymour Stahl*  Attorney

United States Patent Office 3,014,971
Patented Dec. 26, 1961

3,014,971
METHOD OF IMPROVING THE PERMANGANATE TIME OF ETHYL ALCOHOL
Samuel Winfield Wilson, East Baton Rouge, La., assignor to Esso Research and Engineering Company, a corporation of Delaware
Filed Dec. 17, 1958, Ser. No. 781,096
3 Claims. (Cl. 260—643)

This invention is concerned with a process for improving the quality of a crude alcohol formed by acid catalyst hydration of an olefin, and relates more specifically to saturated aliphatic alcohols in the $C_2$–$C_4$ range e.g. ethyl, isopropyl and secondary butyl. More particularly it relates to producing a great improvement in the permanganate time or other similar measure of the quality of the finished alcohol product over that obtained by prior art processes. This is obtained by operating the caustic scrubbing prior to distillation step so as to maintain the titratable acidity of the product from the scrubber within the range of 20–80 mg. of sulfuric acid per 100 ml. of crude alcohol (30–40 vol. percent concentration alcohol) and the pH of said scrubber product within the range of 6.5 to 8.0.

The crude alcohols made by the hydration of olefins contain certain impurities which are present in low concentrations and are very difficult to remove using conventional methods of distillation, such impurities including ethers, aldehydes, aldols, hydrocarbon polymers, sulfur-containing compounds, and unsaturated carbonyls. In order to produce finished alcohols of superior quality, these impurities must be completely eliminated or reduced to extremely low concentration levels. It is known that a number of the impurities mentioned, such as some of the low and high boiling impurities, can be removed in varying degrees by a water extractive distillation process, as described in the U.S. Patent 2,638,440 of Drout et al.

However, certain impurities, such as the aldols, are not readily removed in the forementioned manner, and these impurities, being thermally unstable and relatively high boiling, decompose on distillation to yield aldehydes, which remain in the final alcohol distillate product. Since the high boiling aldols remain in the bottoms streams, some decomposition occurs in each tower releasing the more volatile carbonyls. These carbonyls thus formed contaminate all overhead and side withdrawal streams. The product alcohol thus possesses poor quality with respect to permanganate time. Therefore, the present invention has the object of improving the caustic treating and quality of the crude alcohol so that in the subsequent distillation finishing process such impurities as would otherwise exist in the final product from the distillation procedures are effectively minimized.

The improved finishing process of the present invention will be described only with reference to the manufacture and purification of ethanol, although it can be applied to other $C_2$–$C_4$ alcohols, e.g. isopropanol and secondary butanols. Its application to the latter from the description which follows will be obvious.

Ethylene is absorbed under pressure in 95 to 99% sulfuric acid at temperatures of 70 to 100° C. e.g. 75° C. The absorption of the ethylene is carried out in an absorption zone such as a tower equipped with means for dispensing the olefin gas into contact with a countercurrent stream of the acid. The absorption results in formation of an acid extract containing ethyl hydrogen sulfate and diethyl sulfate (about 1.3 moles ethylene per mole of sulfuric acid). The acid extract is diluted with water to release ethanol by hydrolysis. In the absorption and hydrolysis reactions, ether and other by-products are formed and also $SO_2$ is formed and released due to some acid decomposition. Following the hydrolysis, the raw alcohol is stripped from the acid in a so-called generator.

The crude ethanol vapors from the generator contain in addition to alcohol, ether, small amounts of carbonyls and miscellaneous other organic material, varying amounts of sulfur dioxide. The amount of sulfur dioxide released is greater if steam from the acid reboilers is used as stripping steam in the generator. The vapors from the generator(s) are scrubbed usually countercurrently to neutralize and remove acidic materials from the crude alcohol prior to condensing and the final acidity or alkalinity of the crude alcohol is controlled by the direct addition of small amounts of caustic. In conventional operations prior to the present, excess caustic was added in the vapor scrubber so that the vapor scrubber bottoms showed some residual alkalinity, i.e. pH above 8 or some phenolphthalein alkalinity. Thus, the crude alcohol in such operations after addition of sufficient caustic to maintain the pH of the crude between 6.0–9.5 as was conventionally prescribed, contained from 10–15 mg. of alkalinity (milligrams of NaOH per 100 ml. of dilute (30–40 vol. percent) crude alcohol) to 0–10 mg. of acidity calculated as milligrams of $H_2SO_4$ per 100 ml. of dilute crude alcohol, both determined by titration using phenolphthalein as the indicator.

It has now been discovered over the prior art that an improvement in the permanganate time of the subsequently finished alcohol may be obtained by operating the vapor scrubber in such a manner that acidic materials are permitted to be present in the crude alcohol to the extent that while maintaining the pH of the dilute crude between 6.5 and 7.5 by direct addition of caustic, the titratable acidity of the crude using phenolphthalein as the indicator will contain between 20 mg. and 80 mg. of acidity calculated as mg. of $H_2SO_4$ per 100 ml. of dilute crude. This range pertains on the scrubbed alcohol regardless of whether storage is required. According to the present method of operation a deficiency of caustic is used in the vapor scrubber so that the vapor scrubber bottoms are on the acid side and have a pH of about 6.5 to 7.5. It should be noted that acidity is thus controlled within narrow limits so as to be slightly on the acid side with respect to phenolphthalein but at the same time not to be so acid as to be corrosive to carbon steel or to result in an acidic condition in the final distillation column (rectifier) in the finishing unit. Therefore, according to the present invention it is preferred to operate caustic scrubbing so as to obtain pH ranges of 6.0 to 8.0, preferably 6.5 to 7.5 and titratable acidities of 20 to 100, preferably 20 to 80 mg. of $H_2SO_4/100$ ml. of crude alcohol (30–40 vol. percent alcohol) using phenolphthalein as indicator. It should be noted that for higher concentrations of alcohol than 40% titratable acidities would be proportionately higher than the ranges given above and, of course, lower concentrations than 30% would give proportionately smaller titratable acidities.

Improvement in finished alcohol can also be obtained by direct neutralization of the generator overhead (no vapor scrubber) within the above prescribed limits. However, of course the titratable acidities are somewhat more difficult to control within the desired range. The crude alcohol is further diluted with water prior to intermediate storage so that water insoluble impurities will break phase and can be decanted from the crude tanks prior to feeding the crude alcohol to finishing operations.

Flow diagrams of a caustic treating and distillation finishing system are shown in the accompanying drawings for purposes of illustrating procedures used in obtaining finished high quality ethanol in accordance with the present invention.

Figure 2:
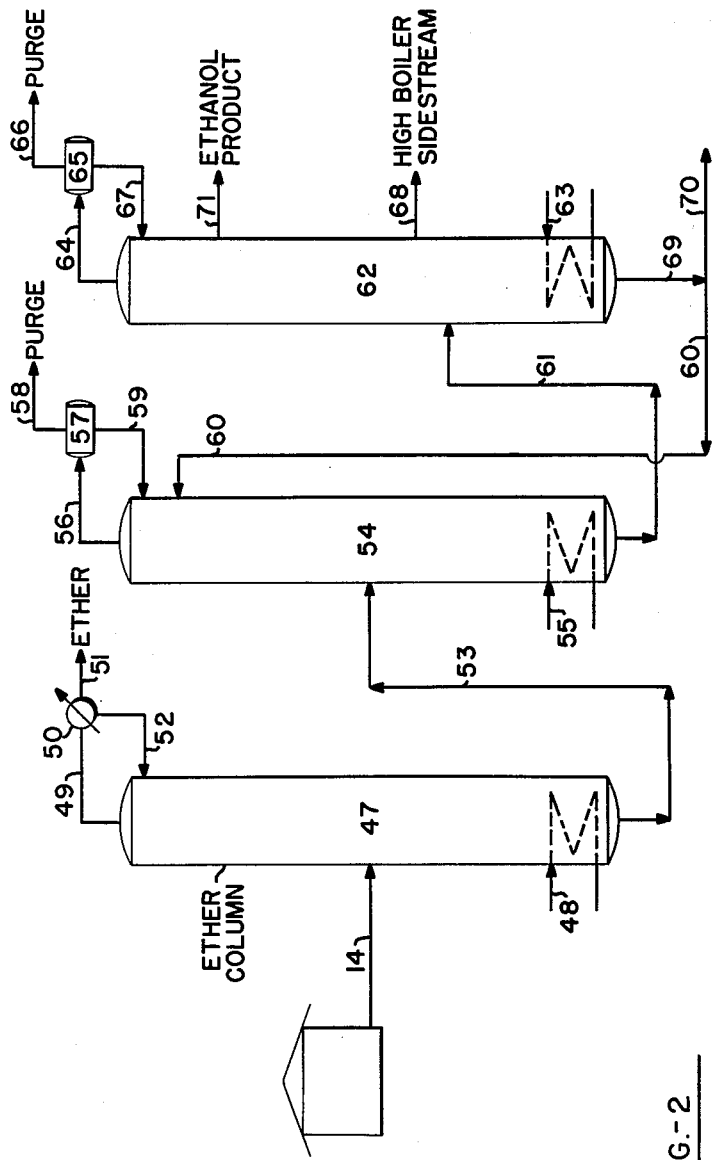

FIGURE 1 illustrates a procedure which employs in addition to the caustic scrubber two columns for the finishing operation. FIGURE 2 shows a preferred modification of the operation in which a third separate column is used for removal of additional high boiling and low boiling impurities.

Referring to FIGURE 1, crude ethanol vapors from the generator are supplied through line 1 to the bottom of caustic scrubber 2, and midway through the tower caustic is supplied through line 3 and higher in the tower water is supplied through line 4 to obtain the desired balance of acidity. Caustic solution is passed to the sewer or other use from line 5 and the partially neutralized slightly acid ethanol is passed through line 6 to condenser 7 and cooler 8. After condensation water is added via line 9 through vent gas scrubber 10 and additional caustic is added if required through line 11. The condensed and diluted alcohol vapors are titrated and a recording pH meter records the pH. Caustic is, of course, added to scrubber 2 as required to control pH and titratable acidity within the desired range indicated above. The slightly acid ethanol is passed to storage tank 12 through line 8a to permit settling of water insoluble impurities which are decanted through line 13. The crude alcohol is fed through line 14 to ether column 15, heated by open steam through line 16 and ether, carbonyl, and impurities and a small amount of alcohol are taken overhead through line 17. Condenser 18 operates to provide a reflux stream 19 to the column and the aforementioned ether, high and low boiling impurities and some alcohol (about ⅓ of the total overhead) are withdrawn through line 20 to ether washer 21 to which water is added via line 22 to provide ether washer bottoms of 12–18 vol. percent alcohol. The ether product plus impurities is withdrawn through line 23 to an ether finishing unit. The bottoms from the ether washer (dil. alcohol) are returned to the ether column via line 24. The bottoms from ether column 15, aqueous ethanol, are fed via line 25 to rectifier (alcohol column) 26. Alcohol is taken overhead via line 27 to dephlegmator (partial condenser) 28 to provide reflux to column 26 via line 29. The uncondensed vapors leave condenser 28 via line 30 to vent condenser 31 where alcohol (about 3% of product) plus traces of impurities are condensed and returned to ether column 15 via lines 32 and 24. Sidestreams are withdrawn to remove residual high boiling impurities to ether column via lines 33, 32 and 24. Alcohol product is withdrawn 3 to 5 plates from the top of the column via line 34. Caustic may be added to the rectifier column 26 at a point above the feed via line 35 to control acidity of the finished product. The aqueous bottoms may then be withdrawn through line 36. It should be noted that the alcohol is continuously purified by having carbonyl impurities removed from the top of each of the towers. In all cases the towers may be of any type as for example, conventional bubble plate towers.

Turning now to FIGURE 2, a system is depicted in which an additional tower additionally purifies the product crude ethanol vapors. Crude alcohol neutralized as described in connection with FIGURE 1, is fed from storage tank 12 described in said figure, via line 14 to ether column 47. In this column heat is supplied by coil 48 or open steam and ether and impurities are taken overhead through line 49, condensed in condenser 50, part of the liquid stream is removed through line 51 and the remainder is recycled to the column through line 52. From the bottom of the column partially purified alcohol is supplied through line 53 to water extractive distillation tower 54, heated by coil 55. Carbonyls and impurities, sulfur dioxide, etc., are taken overhead through line 56, condensation and separation are obtained in condenser 57, the impurities (10–50% of the overhead) are purged through line 58 and a recycle liquid stream is returned through line 59. Water or very dilute alcohol is supplied through line 60 to the upper part of the column and purified alcohol is passed from the bottom of the column through line 61 to final column 62. This column is heated by coil 63 and again impurities are taken overhead through line 64, condensation is obtained in condenser 65, impurities are purged through line 66, and a recycle liquid stream is returned through line 67. Some of the high boiling oily impurities may be removed with water from a plate below or above the feed inlet plate through line 68 and the remaining portion of the aqueous bottoms stripped of alcohol in the lower part of the column is withdrawn through line 69. Part of this predominantly water bottoms is recycled through line 60 to the upper part of column 54 as previously described, and the remainder is discharged from the process through line 70. Purified ethanol product is removed through line 71. By the present system, since additional impurities are purged in tower 54, higher purity ethanol is obtained than in the system shown in FIGURE 1.

A preferred method of neutralizing and finishing the crude ethyl alcohol prepared by the hydration of ethylene is shown in the following example.

EXAMPLE I

The following example utilizing both the equipment described in FIGURE 1 and the equipment described in FIGURE 2, will be presented. Raw ethanol vapors prepared as described above were scrubbed with 10 wt. percent NaOH solution at a pressure of 1–3 p.s.i.g. and a temperature of 90–120° C. in a tower of conventional design to obtain products having the pH acidity and titratable acidity described in the following table. Conditions in columns 15 and 26 and in columns 47, 54 and 62 were as follows:

*Distillation conditions*

| | Column 15 | Column 26 | Column 47 | Column 54 | Column 62 |
|---|---|---|---|---|---|
| Temperatures ° C.: | | | | | |
| Feed | 50–60 | 90–100 | 91 | 138 | 100–110. |
| Overhead | 63 | 80–82 | 60 | 160–165 | 84. |
| Bottoms | 90–100 | 109 | 110–115 | 159 | 114. |
| External Reflux Ratio | 0–2/1 | 4/1–5/1 | 2/1–3/1 | 2/1–6/1 | 4/1–5/1. |
| Percent Purged Overhead | All of the ether and 5% of feed alcohol. | 5% of alcohol in feed to col. | Ether with 0.1% alcohol or about 3–4 vol. % of feed. | 3–4% of alcohol in feed to col. | 5–10% (of alcohol in column feed). |

Data showing the improvement obtained by controlling acidity within the ranges described above are given in the following table. The particular quality test employed was the permanganate time; times of less than 15 minutes being considered poor for sale of the commercial product. The permanganate time indicates the freedom of the alcohol from materials which undergo reaction with potassium permanganate; carbonyl materials for example. Thus, permanganate time is measured by the time in minutes which is required for a 50 ml. sample of the alcohol to which has been added 2 ml. of a 0.02% solution of $KMnO_4$ to change in color when compared to a standard $KMnO_4$ solution of 50 ml. of $H_2O$ to which has been added 2 ml. of a 0.02 wt. percent solution of KMnO₄ both held at 15° C.

Table I

| Vapor Scrubber Bottoms | pH of Crude Alcohol | Titratable Acidity of Crude Alcohol* | Permanganate Time of Finished Alcohol, Minutes | |
|---|---|---|---|---|
| | | | (1) | (2) |
| Basic | 11.0 | 5.0 mg. of NaOH/100 ml. of crude | 2 | 9 |
| Do | 11.0 | 10.0 mg. of NaOH/100 ml | 3 | 8 |
| Do | 8.9 | 10.0 mg. of NaOH/100 ml | 2 | 4 |
| Do | 8.9 | 7.0 mg. of NaOH/100 ml | 4 | 7 |
| Acid | 9.1 | 5.0 mg. of NaOH/100 ml. of crude | 1 | 8 |
| Do | 7.2 | 15.0 mg. of H₂SO₄/100 ml. of crude | 5 | 11 |
| Do | 7.4 | 27 mg. of H₂SO₄/100 ml. of crude | 21 | 45 |
| Do | 7.1 | 30 mg. of H₂SO₄/100 ml. of crude | 19 | 37 |
| Do | 7.0 | 30 mg. of H₂SO₄/100 ml. of crude | 25 | 45 |
| Do | 7.6 | 60 mg. of H₂SO₄/100 ml. of crude | | 42 |
| Do | 8.0 | 47 mg. of H₂SO₄/100 ml. of crude | 25 | 42 |

*Calculated as milligrams of H₂SO₄ per 100 milliliters of crude or milligrams of NaOH per 100 milliliters of crude.
¹ Alcohol from unit described in Figure 1.
² Alcohol from unit described in Figure 2.

What is claimed is:

1. In the finishing of a crude aqueous ethyl alcohol formed by the sulfuric acid catalyst hydration of ethylene in which characteristic low boiling impurities including ether and higher boiling impurities including aldol, unsaturated aldehyde, polymer and sulfur compounds, are present or are formed, the improvement of after stripping the alcohol from the acid in a generator, caustic treating with that amount of caustic to continuously obtain a crude caustic treated alcohol having a titratable acidity within the range of 20 to 100 milligrams of $H_2SO_4$ per 100 milliliters of crude alcohol and a pH in the range of 6.0–8.0, said caustic treating being continuously controlled responsive to measurements of pH and titratable acidity on the caustic treated alcohol, and distilling the caustic scrubbed material to improve the purity thereof.

2. In the finishing of a crude aqueous ethyl alcohol formed by the sulfuric acid catalyst hydration of ethylene in which characterisctic low boiling impurities including ether and higher boiling impurities includng aldol, unsaturated aldehyde, polymer and sulfur compounds, are present or are formed, the improvement of after stripping the alcohol from the acid in a generator caustic treating with that amount of caustic to continuously obtain a crude caustic treated alcohol having a titratable acidity within the range of 20 to 80 milligrams of $H_2SO_4$ per 100 milliliters of crude alcohol and a pH in the range of 6.5–7.5, said caustic treating being continuously controlled responsive to measurements of pH and titratable acidity on the caustic treated alcohol, and distilling the caustic scrubbed material to improve the purity thereof.

3. The process of claim 2 in which distillation is conducted in a series of columns and light boiling impurities are removed from the top of each of the columns.

References Cited in the file of this patent

UNITED STATES PATENTS

| Re. 23,507 | Maycock et al. | May 27, 1952 |
| 2,533,754 | Ballard et al. | Dec. 12, 1950 |

FOREIGN PATENTS

| 527,316 | Great Britain | Oct. 7, 1940 |